United States Patent [19]

Hall, Jr.

[11] Patent Number: 4,663,747
[45] Date of Patent: May 5, 1987

[54] VARIFLUX VIBRATION TRANSDUCER

[75] Inventor: Ernest M. Hall, Jr., Houston, Tex.

[73] Assignee: Oyo Corporation, U.S.A., Houston, Tex.

[21] Appl. No.: 676,645

[22] Filed: Nov. 30, 1984

[51] Int. Cl.⁴ ............................................. G01V 1/16
[52] U.S. Cl. ..................................... 367/178; 73/652
[58] Field of Search .............. 367/185, 178, 186, 187, 367/182, 183, 184, 173; 73/652, 1 D; 29/602 A

[56] References Cited

U.S. PATENT DOCUMENTS 3,913,063 10/1975 Sears .................................... 367/183
4,159,464 6/1979 Hall, Jr. .............................. 367/182

Primary Examiner—Thomas H. Tarcza
Assistant Examiner—Ian J. Lobo
Attorney, Agent, or Firm—Michael P. Breston

[57] ABSTRACT

The method of detecting vibrations comprises establishing a magnetic circuit with magnetic flux producing means and at least one airgap. Elastically supporting an annular non-magnetic conductor within the airgap. Fixedly supporting an annular coil in the airgap without there being relative movement between the coil means and the airgap, so that an electric signal becomes induced in the coil means in response to relative movement between the annular conductor and the airgap.

The vibration transducer comprises a magnetic circuit having magnetic flux producing means and at least one airgap. An annular non-magnetic conductor is elastically supported within the airgap. An annular coil means is fixedly supported in the airgap without there being relative movement between the coil means and the airgap, so that an electric signal becomes induced in the coil means in response to relative movement between the annular conductor and the airgap.

25 Claims, 9 Drawing Figures

VARIFLUX VIBRATION TRANSDUCER

BACKGROUND OF THE INVENTION

1. Field of the Invention

This invention generally relates to electromagnetic vibration transducers and to methods of transducing vibrations, and in particular to such transducers having one element supported by springs for movement relative to another element thereof.

This invention has utility in any electromagnetic transducer that is motion sensitive, such as a seismometer, wherein relative movement between two members or elements induces a signal in a coil.

2. Description of the Prior Art

Seismometers which sense vibrations or tremors of the earth include two elements: one element coupled to the earth to move with it, and the other element to resist such movement due to its inertia. When conditions are ideal, the inertia element remains stationary while the element coupled to the earth moves with the earth. Under such ideal conditions, the relative movement between the elements is a faithful measure of the movement of the earth.

Attempts have been made to develop seismometers wherein the inertia element is the magnet and magnetic circuit, see for example U.S. Pat. Nos. 3,577,184 and 3,878,504. It has also been suggested to fix the coil to the magnet and to the pole pieces, as in U.S. Pat. Nos. 2,130,213 and 2,759,167. These seismometers, however, have not met with any commercial success, if they have ever been built.

In present day seismometers, the element that moves with the earth includes a magnet, and the inertia element (tending to remain stationary) includes a coil positioned in airgaps of the magnetic circuit. The relative motion between the coil and magnetic field induces a signal in the coil which is a measure of the earth's movement. These seismometers, generally known as moving coil seismometers, suffer however from well known drawbacks. Below will be listed only a few of such drawbacks to illustrate the problems which the novel variflux vibration transducers of this invention have solved.

1. If seismometers are poorly coupled to the ground, the signals which they produce are not truly proportional to the earth's movement. It is known that better results could be obtained from a seismometer having a relatively heavy inertia element. But in presently used seismometers, the weight of the mass-coil (coilform and coil thereon) is typically small in comparison to the total weight of the seismometer. For example, the inertia mass normally is only about 10% to 15% of the total mass of the seismometer. It has been a desirata, for a long time, to increase said mass ratio so that the seismometer would move in better unison with the earth, while the inertia mass remains stationary. One of the objects of this invention is to increase substantially said mass ratio.

2. The practice of interconnecting seismometers in groups to form arrays causes the seismometers to "communicate" with each other, which means that the mechanical excitation of one seismometer electrically energizes and moves the coils in all the other seismometers in the group. Obviously, if the excitation of one seismometer is due to noise, all the other seismometers in the group will also pick up the same noise. It is a further object of this invention to eliminate this communication problem between interconnected seismometers.

3. Most seismometers use either slip rings or pig tails, which are small, spirally wound wires, for providing electrical continuity to their moving coils. Both of these types of connections have well known disadvantages and advantages. It is a further object of this invention to preserve the advantages offered by the slip ring and the pig tail connections while eliminating their disadvantages.

4. Generally, present day seismometers attenuate, at about 12 db per octave, signals having frequencies below the natural frequency of the seismometer. It is an object of this invention to greatly increase this attenuation.

5. As seismic signals propogate through the earth, the earth attenuates the higher frequencies at a faster rate than it attenuates the lower frequencies. It is yet a further object of this invention to provide vibration transducers whose frequency response has a higher sensitivity to higher frequencies than to lower frequencies, in order to automatically compensate for the higher attenuation by the earth of the higher frequency signals.

SUMMARY OF THE INVENTION

The novel variflux vibration transducer comprises a magnetic circuit having magnetic flux producing means and at least one airgap. An annular, non-magnetic conductor is elastically supported within the airgap. An annular coil means is fixedly supported in the airgap in radially spaced, concentric relation with the annular conductor, without there being relative movement between the coil means and the airgap, so that an electric signal becomes induced in the coil means in response to relative movement between the annular conductor and the airgap.

The method of detecting vibrations comprises establishing a magnetic circuit with magnetic flux producing means and at least one airgap. Elastically supporting an annular non-magnetic conductor within the airgap. Fixedly supporting an annular coil means in the airgap in radially spaced, concentric relation with the annular conductor, without there being relative movement between the coil means and the airgap, so that an electric signal becomes induced in the coil means in response to a parameter of the relative movement between the annular conductor and the airgap.

This parameter is the acceleration of the relative movement. The mass of the inertia member should be between 20% and 50% of the total mass of the transducer, and 35% is preferred.

Figure 1:
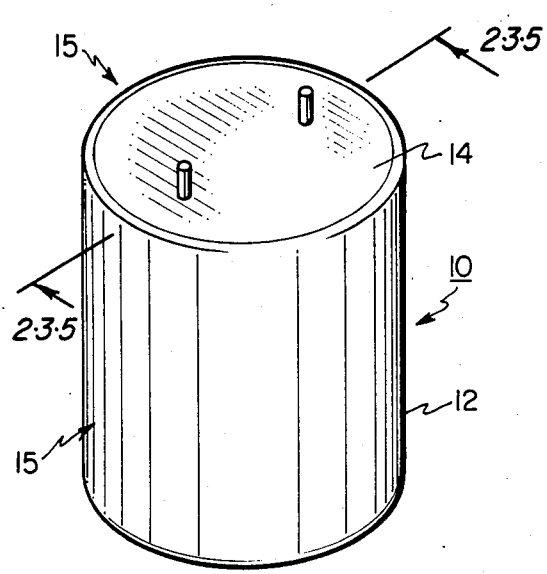
FIG. 1 is a perspective view of a preferred embodiment of the transducer constructed in accordance with the present invention.

DESCRIPTION OF THE PREFERRED EMBODIMENTS.

To simplify the description, symmetrical parts will be designated with a "prime" ('), and the description of the parts having primed reference characters will be limited to a minimum.

The prefered embodiment of the novel variflux vibration transducer 10 of this invention comprises a case 12 of magnetic material which is terminated in end caps 14-14' of non-magnetic material. Together they constitute a fluid tight housing 15.

Figure 3:
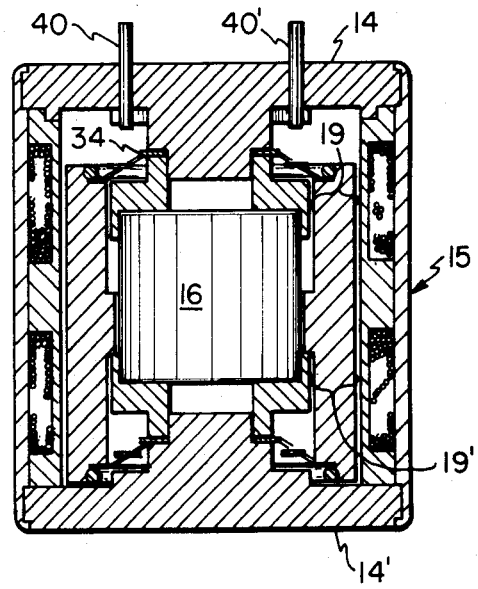

The magnetic circuit of vibration transducer 10 comprises a cylindrical permanent magnet 16, pole pieces 18-18', airgaps 19-19' (FIG. 3) and case 12.

The Z-shaped pole pieces 18-18' captivate magnet 16 and provide means for centering the magnet with respect to case 12. The flux lines in the magnetic circuit flow from the north pole of magnet 16 through the upper pole piece 18, the upper airgap 19, case 12, the lower airgap 19', the lower pole piece 18', and return to the magnet's south pole. The construction of this magnetic circuit is conventional for dual coil seismometers.

There is provided a coil assembly 20, which includes a cylindrical coilform 22 made of a non-magnetic material of thin cross section. A dividing shoulder radially extends outwardly from the center of coilform 22 to provide a pair of spaces 24-24', respectively containing a pair of coil windings 26-26' of equal axial length and of the same number of turns of the same size of insulated wire.

Although two windings 26-26' are shown, it is contemplated that a single winding may be employed which reverses direction at its center. Another possibility is to connect internally windings 26-26' in series, in the proper phase relationship, so as to bring only two wires 27-27', rather than four wires, out of the windings.

In accordance with the present invention, an annular inertia member 30, preferably in the form of a cylindrical slug 32, surrounds magnet 16 and is positioned within airgaps 19-19' coaxially with magnet 16 and coilform 22. Slug 32 fills most of the space within airgaps 19-19', but sufficient clearance is provided within the airgaps so that slug 32 can move vertically without rubbing or dragging magnet 16 or magnet pole pieces 18-18' on one side, and/or coilform 22 on the opposite side. No space is provided between coilform 22 and the inner cylindrical wall 13 of case 12.

Slug 32 is resiliently suspended from a pair of upper and lower disc-shaped spider springs 34-34', tpically made of beryllium copper. Each spring is preformed so that its outer periphery 35 is in a plane above the plane containing its inner periphery 36. Any other known spring suspension system can be substituted for the spider springs 34-34'.

It is the function of the spring system to coaxially maintain slug 32 in airgaps 19-19', and to elastically support slug 32 for axial movement relative to coaxial magnet 16 and coaxial coilform 22.

End caps 14-14' have axially aligned guide posts 11 provided with spring-locking shoulders 17. Each pole piece captures the inner periphery 36 against its shoulder 17, and magnet 16 is captivated between pole pieces 18-18'. The outer peripheries 35 of spiders 34-34' are fixed to the opposite ends of slug 32 by snap rings 38-38' which respectively hold them in position. The snap rings 38-38' are located within annular grooves 39-39' of slug 32. This arrangement centers slug 32 with respect to the remainder of the parts in transducer 10 and keeps the slug aligned during its axial excursions.

Figure 4:
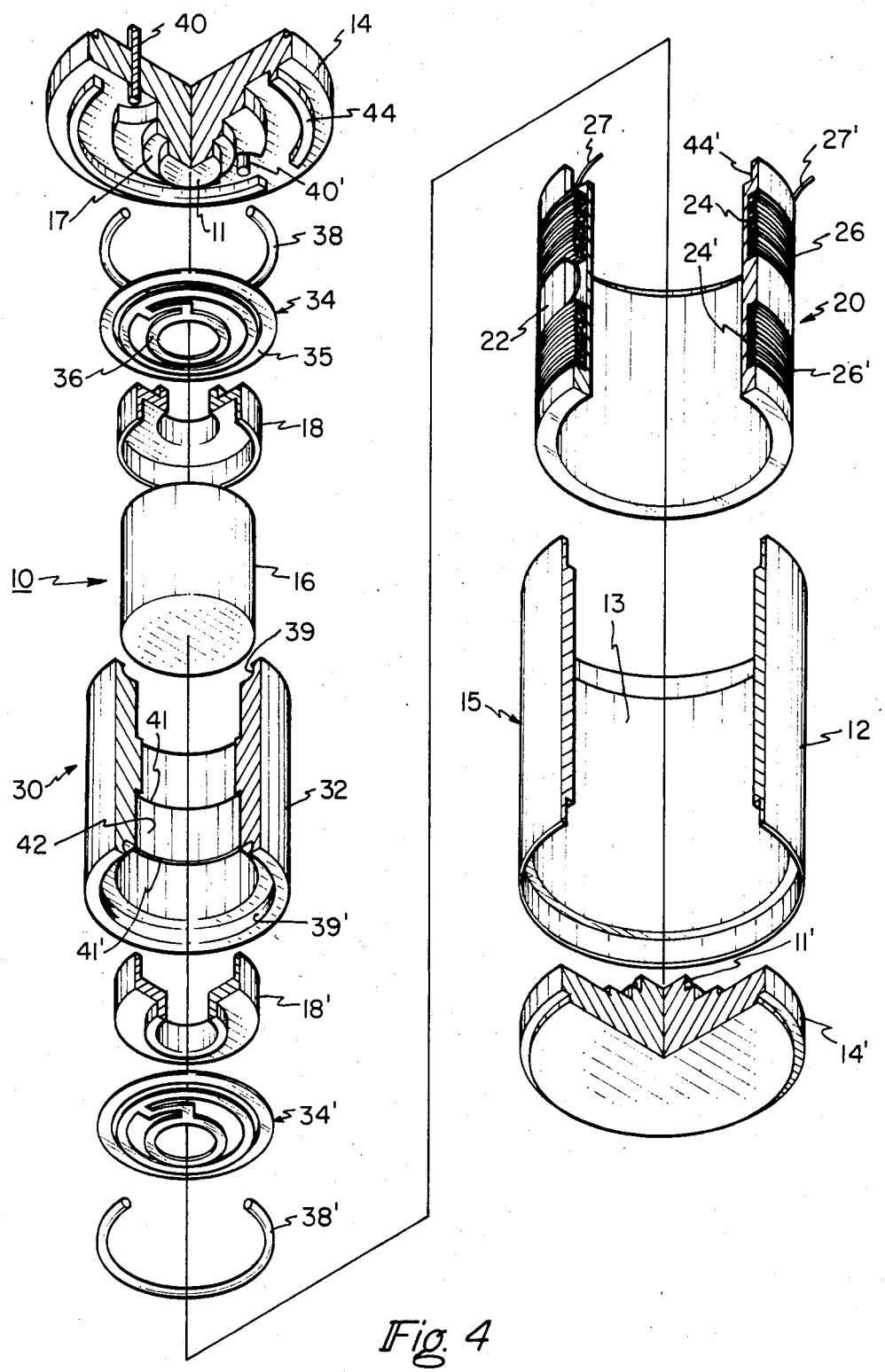
FIG. 4 is an exploded view of the transducer of FIG. 1.

Considering the elements thus far described, it will be observed that the transducer's components are pressure-fitted and stacked inside each other, thereby requiring a minimum of assembly time and relatively unskilled labor. Shoulder 44 in end cap 14 (FIG. 4) locks against mating shoulder 44' in coilform 22.

This symmetrical arrangement of the parts lends important manufacturing and operational advantages, which considerably lower the cost of manufacturing transducers 10.

The arrangement of the parts is symmetrical relative to both the horizontal and vertical planes passing through the center of magnet 16, and therefore transducer 10 generates a minimum of second harmonic content.

Also, when transducers 10 are interconnected into a group and are excited uniformly, the signals induced within coils 20 of the group will be substantially in phase.

Terminals 40-40' are affixed to end cap 14 and are stationary with respect thereto. Both end cap 14 and coilform 22 are structurally fixed to cylindrical case 12, and thus no relative motion is permitted between coil assembly 20 and terminals 40-40'. For this reason, output wires 27-27' of coil assembly 20 can be solder connected directly to output terminals 40-40'.

Such direct connection between coil 20 and terminals 40-40' is a very important advantage over moving coil type seismometers.

The above mentioned and other apparent advantages of this invention contribute significantly to greater reliability, reduced cost of manufacturing, and allow transducer 10 to be lightweight, small and yet rugged. In these respects, novel transducer 10 presents a substantial departure from current commercial seismometer designs.

It will be observed from the drawings that inertia slug 32 is free to move in an axial direction within predetermined limits determined by the opposite edges 41- 41' on shoulder 42 of slug 32 (FIG. 4) and by the inner peripheries of pole pieces 18-18'.

Figure 5:
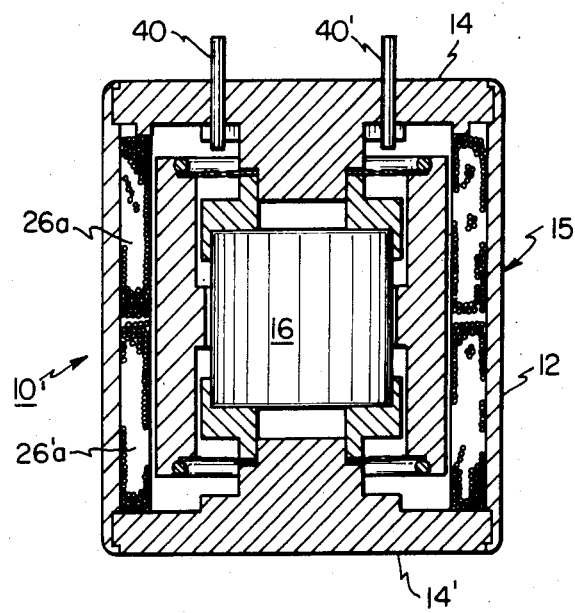
FIG. 5 is a view of a modified transducer similar to FIG. 2, but utilizing a coil assembly without a coilform, and showing the modified transducer and its springs in their non-excited condition.
Figure 2:
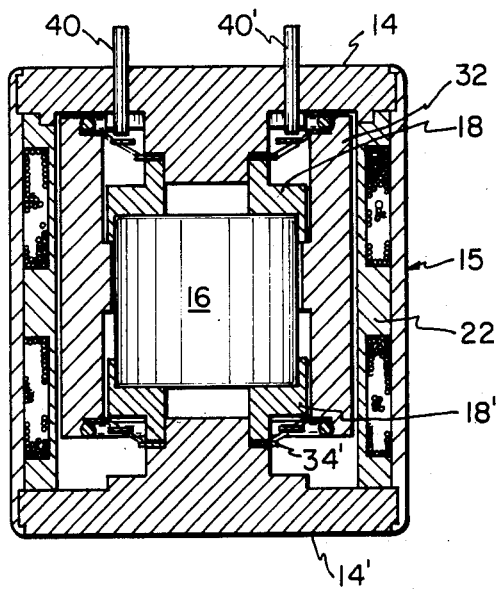
FIGS. 2 and 3 are sectional views of the transducer along lines 2—2 and 3—3 in FIG. 1, respectively, showing the springs in their opposed extreme modes in response to opposed extreme excitations applied to the transducer.

As shown in the modified embodiment 10' of FIG. 5, windings 26a, 26'a can be cast against inner cylindrical wall 13 of case 12 without the use of a coilform 22. The remaining parts in the modified transducer 10' are identical to those of transducer 10.

Also, while transducers 10 and 10' are described as being adapted for picking up vertical motion, it will be appreciated that they can be easily adapted for picking up horizontal motion as well, and the selection of springs 34-34', their thickness and weight, together with other internal design conditions for converting transducer 10 into a horizontal transducer are well understood in the art.

When considering the operation of transducer 10, it is helpful to think of inertia slug 32 as constituting one element of the transducer, and all the remaining parts in the structure as constituting another element of the transducer, the two elements being capable of relative movement.

Magnet 16 generates a constant magnetic field in the airgaps 19-19' between pole pieces 18-18' and cylindrical case 12. When slug 32 is at rest, there is no signal induced in coil 20. Mechanical excitation or vibration producing relative movement between the one element (slug 32) and the other element (the rest of transducer 10) will induce eddy currents in slug 32.

The amplitudes of such eddy currents will change with the relative movements of the slug. The magnetic fields produced by such variable eddy currents are proportional to the velocities of such movements.

Windings 26-26' in airgaps 19-19' intercept the changing magnetic fields produced by the eddy currents in slug 32. As a result, the currents or voltages induced in windings 26-26' will be proportional to the acceleration, i.e., the rate of change of the velocity of slug 32.

By suitably proportioning the parts to develop a uniform magnetic field in airgaps 19-19', whereby the number of lines of magnetic flux cut by slug 32 is uniform over its operating range, the output voltage from coil 20 will be substantially proportional to the acceleration of the earth movements coupled to case 12.

When using the above-described construction principle, a transducer 10 has been constructed which had a diameter of 2.22 cm, a height of 2.54 cm, a mass for coil assembly 20 of 16 gr, and a total weight for transducer 10 of 49 gr. The magnet 16 had a diameter of 1.02 cm and a length of 1.02 cm. This magnet 16 was disposed in a bore of 1.17 cm formed in slug 32. The coilform 22 had a length of 2.03 cm while each of windings 26-26' were spaced 0.17 cm from the ends of the coilform and were 0.38 cm apart. The case 12 was made of soft iron with an outside diameter of 2.22 cm and an inside diameter of 2.03 cm. The material of magnet 16 was Alnico IX, and each of windings 26-26' consisted of 750 turns of No.39 AWG wire. Slug 32 was made of leaded copper known in the trade as ASTM-B-187. Slug 32 was 1.8 cm long and had a diameter of 1.6 cm.

As previously mentioned, in presently used seismometers, the weight of the mass-coil (coilform and coil thereon) is typically small in comparison to the total weight of the seismometer. For example, the inertia mass normally is only about 10% to 15% of the total mass of the seismometer. This invention allows to increase said mass ratio so that the seismometer would move in better unison with the earth, while the inertia mass remains stationary. To take advantage of the invention in this respect, the mass of slug 32 should preferably be between 20% to 50% of the total mass of transducer 10, which results in a more faithful output electric signal in response to mechanical excitation imparted to case 12. The preferred value within that range for the mass of slug 32 is 35% of the total mass of transducer 10.

Since there can be no relative movement between coil 20 and air gaps 19-19', coil 20 appears at terminals 40-40' as a resistive load. Therefore, when several vibration transducers 10, interconnected in groups to form arrays, are excited uniformly, the individual transducers 10 within each group will produce signals which will be substantially in phase and will have a minimal harmonic content.

Moreover, because transducers 10 appear at their output terminals as resistive loads, their signals are predictable, which facilitates network analysis. This is in contrast to current commercial seismometers utilizing moving coils, because the impedances of such devices are a function of frequency and factor of damping.

An additional advantage of the present invention is derived from the fact that interconnected transducers will not "communicate" with each other in response to mechanical excitation applied to only one transducer 10 within a group, for the reason that coils 20 in all the other transducers are locked and cannot induce a motional response in inertia members 30 in response to an electrical energization.

Thus, mechanical excitation, which may be a noise burst administered to one transducer 10 only, will not subject all the other transducers in the group to this noise burst, whereas a moving coil type transducer suffers from the problem of one transducer electrically driving all the other transducers in the group.

Therefore, the composite electric signal appearing at the output of the group will constitute a composite measure of the relative movements of the inertia members 30 in the individual transducers 10 forming the group, without the motion of any one inertia element 30 affecting the motion of any other inertia element.

It was found that transducer 10 attenuates frequencies below the natural frequency of the transducer at about 18 db/per octave, instead of the common 12 db/octave, in keeping with the 6 db/octave enhancement of frequencies above said natural frequency of the transducer.

The greater attenuation of the lower frequencies and the enhancement of the higher frequencies offer remarkable advantages for seismic detection since they compensate automatically for the undesirably high levels of low frequencies, as propogated by the earth, and for the attenuation by the earth of the higher frequencies.

In sum, transducer 10 provides a response curve which favors higher frequencies, provides greater low-cut filtering, and eliminates the need for pig tail and slip ring connections.

Figure 8:
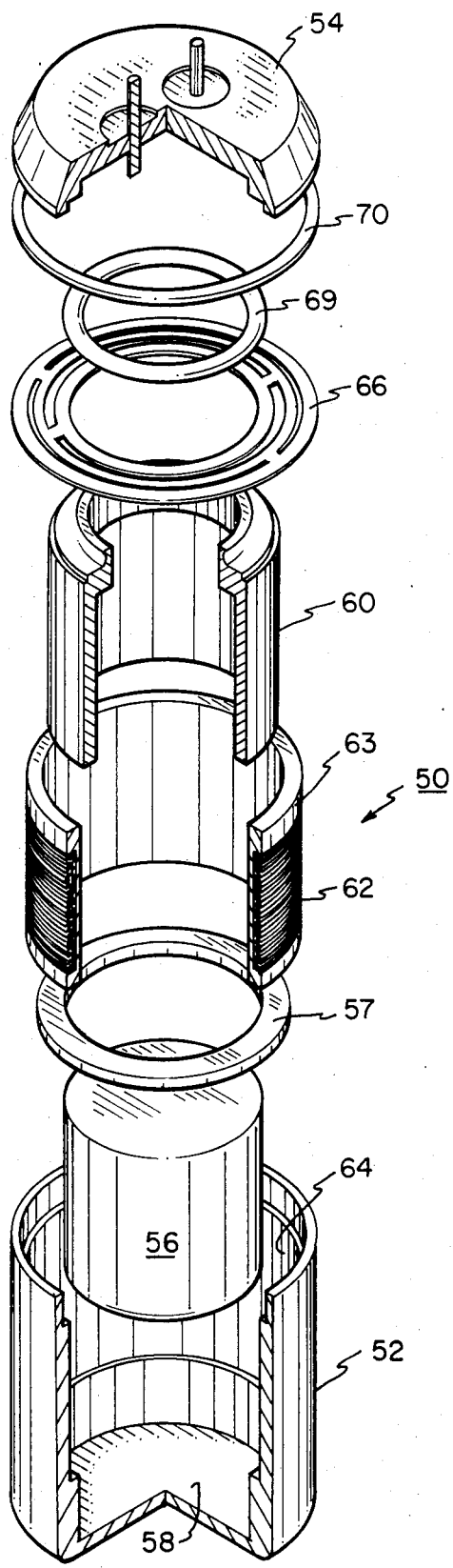
FIG. 8 is an exploded view of the transducer shown in FIG. 6.
Figure 7:
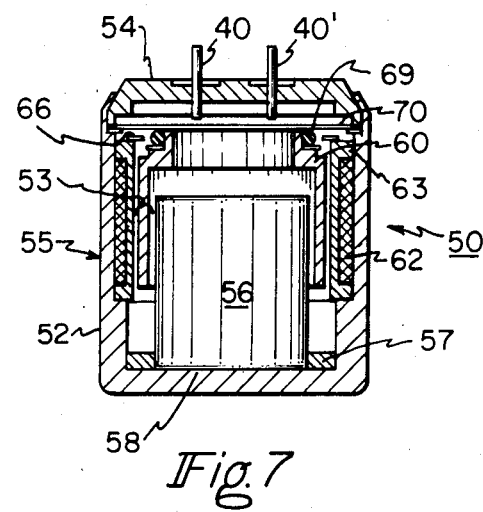
FIG. 7 is a sectional view of the transducer taken along line 7—7 in FIG. 6.
Figure 6:
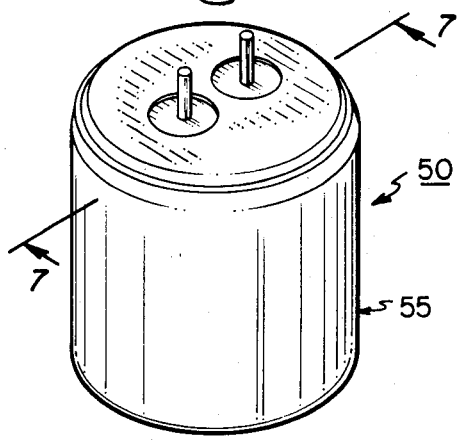
FIG. 6 is a perspective view of another embodiment of the transducer constructed in accordance with the present invention.

Another embodiment of the variflux transducer of this invention is shown in FIGS. 6-8. Vibration transducer 50 comprises a case 52 of soft iron magnetic material that is terminated in an end cap 54 of non-magnetic material. Together they constitute a fluid tight housing 55.

The magnetic circuit of vibration transducer 50 comprises a cylindrical permanent magnet 56, case 52, and an airgap 53. A ring 57 captivates magnet 56 and centers it with respect to the bottom 58 of case 52. The flux lines in this magnetic circuit flow from the north pole of magnet 56 through airgap 53, case 52, and return to the magnet's south pole. The construction of this magnetic circuit for a single coil is conventional.

In accordance with the present invention, an annular inertia member, preferably in the form of a cylindrical slug 60, surrounds magnet 56 and is positioned within airgap 53 coaxially with magnet 56.

A coilform 63 carries a winding 62 of insulated wire and is positioned within airgap 53 to intercept the changing magnetic fields produced by the eddy currents flowing in inertia member 60. As a result, the currents or voltages induced in coil 62 will be proportional to the acceleration, i.e., the rate of change of the velocity of slug 60.

Sufficient clearance is provided within airgap 53 to allow slug 60 to move axially without rubbing or dragging against magnet 56, on one side, and/or against coil 62 on the opposite side. No space is provided between coil 62 and the inner cylindrical wall 64 of case 52. Slug 60 is resiliently suspended from a single disc-shaped spider spring 66 which is retained in place by rings 69 and 70.

Figure 9:
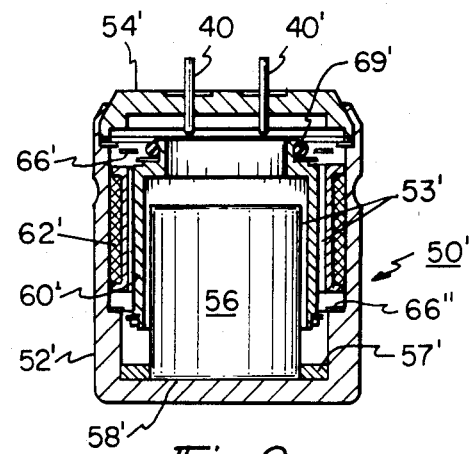
FIG. 9 is a sectional view of a modified embodiment similar to FIG. 7, but utilizing a pair of spider springs.

The modified transducer 50', shown in FIG. 9, is similar to transducer 50, except that slug 60' is now resiliently suspended from a pair of upper and lower disc-shaped spider springs 66'-66".

It is the function of the spring or springs in transducers 50 and 50' to coaxially maintain slugs 60 and 60' in airgap 53, and to elastically support them for axial movement relative to coaxial magnet 56 and coaxial coil 62.

The operations of transducers 50 and 50' are essentially the same as the operation of transducer 10 previously described, and a repetition thereof is believed unnecessary.

What I claim is:

1. A vibration transducer, comprising:
    a cylindrical case of magnetic material, said case defining a cylindrical inner bore;
    a cylindrical magnet means structurally fixed to and in said case;
    said magnet means and case constituting a substantially closed magnetic circuit having a pair of airgaps;
    an inertia member of metallic, conductive and non-magnetic material radially spaced from said magnet means;
    coil means radially disposed between said case and said inertia member, said coil means being structurally fixed to said case to prevent relative motion between said magnet means and said coil means; and
    spring means for maintaining and elastically supporting said inertia member, said spring means permitting axial movement by said inertia member relative to said air gaps so that an electric signal becomes induced in said coil means which is proportional to a parameter of said relative movement.

2. The transducer of claim 1, wherein said parameter is the acceleration of said axial movement.

3. The transducer of claim 1, wherein
    said case constitutes one soft iron pole piece on one end of said magnet means;
    the opposite end of said magnet means and said case defining an airgap therebetween; and
    said inertia member being disposed in said airgap and surrounding said magnet means.

4. The transducer of claim 1, wherein
    said case is terminated by a pair of non-magnetic end caps which axially and radially position said magnet means within said bore;
    the space between each end of said magnet means and said case defining an airgap; and
    said inertia member being disposed in said airgaps.

5. The transducer of claim 2, wherein
    said case is terminated by a pair of non-magnetic end caps;
    a soft iron pole piece at each end of said magnet means, whereby an airgap is defined between each pole piece and said case; and
    said inertia member being disposed in said airgaps.

6. The transducer of claim 1, wherein
    said coil means includes a non-magnetic cylinder radially spaced from and encircling said inertia member; and
    at least one winding on said cylinder.

7. The transducer of claim 3, wherein
    said coil means include a cylinder radially spaced from and encircling said inertia member; and
    at least one winding on said cylinder.

8. The transducer of claim 4, wherein
    said coil means include a non-magnetic cylinder radially spaced from and encircling said inertia member; and
    at least one winding on said cylinder.

9. A vibration transducer, comprising:
    a housing including a cylindrical case of magnetic material, and a non-magnetic end cap at each end of said case;
    a cylindrical magnet in said case and having a pole piece at each axial end thereof;
    said magnet, pole pieces, and case constituting a substantially closed magnetic circuit having a pair of airgaps between said pole pieces and said case;
    an annular slug member of metallic, conductive and non-magnetic material, said slug member being radially spaced from and encircling said magnet;
    coil means radially spaced from and encircling said slug member; said coil means, magnet, and case being held together as a unit in said housing with no relative motion between said coil means, magnet and case; and
    spring means for coaxially maintaining said slug member in said airgaps, and for elastically supporting said slug member for axial movement relative to said unit whereby a mechanical vibration imparted to said housing induces eddy currents in said slug member that produce an electric signal in said coil means, and said electric signal being substantially proportional to a parameter of said axial movement.

10. The transducer of claim 9, wherein said parameter is the acceleration of said movement.

11. An electromagnetic vibration transducer, comprising:
    a housing including a cylindrical case of magnetic material, a cylindrical magnet in the bore of said case, and an annular inertia slug member of metallic, conductive and non-magnetic material spaced radially from and encircling said magnet;
    annular coil means radially spaced from and encircling said inertia slug member; said coil means, magnet, and case being held together in said housing as a unit with no relative motion between said coil means, magnet and case; and
    spring means for coaxially maintaining and elastically supporting said inertia slug member for axial movement relative to said unit, whereby a mechanical vibration imparted to said housing induces an electric signal in said coil means which is proportional to a parameter of said axial movement.

12. The transducer of claim 11, wherein said parameter is the acceleration of said movement.

13. The transducer of claim 11, and
    a pole piece at each pole of said magnet for captivating said magnet between said pole pieces; and
    said coil means includes a coilform of non-magnetic material and at least one winding mounted thereon.

14. The transducer of claim 11, and
    a pair of end caps for said case; and
    a pair of output terminals in one end cap for connecting to said coil means.

15. The transducer of claim 11, wherein said spring means include a pair of flat spring spiders, each having a peripheral annular portion in engagement with one end of said slug member, and an inner annular portion captivated between a pole piece and an end cap.

16. The transducer of claim 11, wherein
the ratio between the mass of said slug and the mass of said transducer has a value between 20% and 50%.

17. The transducer of claim 16, wherein the ratio between the mass of said slug and the mass of said transducer has a value of approximately 35%.

18. A vibration transducer, comprising:
a cylindrical housing having a case of magnetic material, said case defining a cylindrical inner bore;
a cylindrical magnet in said bore;
said magnet and case forming part of a substantially closed magnetic circuit having a pair of airgaps;
an annular inertia conductor of non-magnetic material radially spaced from and encircling said magnet;
coil means radially spaced from and encircling said inertia conductor; said coil means, magnet, and case being held together in said housing as a unit with no relative motion between said coil means, magnet and case; and
spring means elastically supporting said inertia conductor for axial movement relative to said unit, whereby a mechanical vibration imparted to said housing induces an electric signal in said coil means in response to the relative movement between said inertia conductor and said unit, and said electric signal being substantially proportional to a parameter of said axial movement.

19. The transducer of claim 18, wherein
said signal is substantially proportional to the acceleration of said movements.

20. The transducer of claim 18, wherein
said annular conductor has a mass which is at least 20% of the total mass of said transducer.

21. A vibration transducer, comprising:
a cylindrical case of magnetic material defining a cylindrical inner bore;
a cylindrical magnet structurally fixed to and in said case, said magnet and case defining at least one annular airgap therebetween;
said magnet and case constituting a substantially closed magnetic circuit;
an inertia annular member of metallic, conductive and non-magnetic material mounted in said airgap and being radially spaced from said magnet;
coil means mounted in said airgap and being radially spaced from and between said case and said inertia member, and said coil means being structurally fixed to said case to prevent relative motion between said magnet and said coil means; and
spring means for elastically supporting said inertia member to permit axial movement by said inertia member relative to said magnet, so that an electric signal becomes induced in said coil means in response to relative movement between said annular conductor and said airgap.

22. In a vibration transducer including a hollow magnetic cylindrical casing housing therein a cylindrical permanent magnet which establishes with said casing a magnetic circuit defining at least one airgap, spring means, and an annular coil means within said casing, the improvement comprising:
an annular, non-magnetic conductor within said airgap said conductor being radially spaced from and encircling said magnet;
said coil means being within said airgap and being radially spaced from and encircling said conductor; said coil means, magnet, and casing being held together as a unit with no relative motion between said coil means, magnet and casing; and
said spring means elastically supporting said annular conductor within said airgap for axial movements relative to said coil means, whereby, in use, eddy currents become induced in said conductor when vibrations are imparted through said casing to said conductor, said eddy currents causing a voltage signal to become induced in said coil means in response to the relative movements between said conductor and said coil means within said airgap, and the amplitude of said voltage signal being substantially proportional to a parameter of said movements.

23. The transducer according to claim 22, wherein
the mass of said conductor is between 20% and 50% of the total mass of said transducer.

24. The transducer according to claim 22, and
at least one pole piece situated at one end of said magnet; and
said magnet, said pole piece, and said casing forming said magnetic circuit which has said airgap between said pole piece and said casing.

25. The vibration transducer according to claim 24, and a pair of non-magnetic end caps, a pair of soft iron pole pieces at the opposite ends of said magnet, whereby an airgap is defined between each pole piece and said casing, said spring means include a pair of spider springs for maintaining said annular conductor coaxially with said magnet, said coil means include a non-magnetic cylinder radially spaced from and encircling said conductor, and at least one winding on said non-magnetic cylinder.

* * * * *